Patented Mar. 6, 1934

1,950,348

UNITED STATES PATENT OFFICE 1,950,348

ANTHRAQUINONE DERIVATIVE AND PROCESS OF PREPARING THE SAME

Alexander J. Wuertz, Carrollville, Wis., assignor to E. I. du Pont de Nemours & Company, Wilmington, Del., a corporation of Delaware No Drawing. Original application May 21, 1929, Serial No. 364,943. Divided and this application September 14, 1932, Serial No. 633,081

8 Claims. (Cl. 260—60)

This application is a division of my copending application Serial No. 364,943, filed May 21, 1929.

The invention herein set forth relates to new anthraquinone derivatives which are useful as intermediates for vat dyestuffs. More particularly, it relates to dicarboxylic acid derivatives of anthraquinone which are typified by the formula

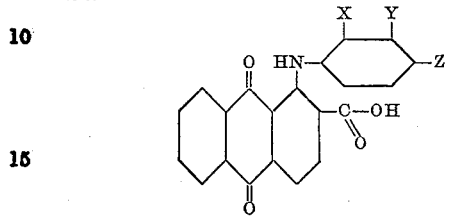

(wherein one of the substituents X, Y and Z represents the radical

 ).

The prior art patents German #237,236; British #894 of 1911; French #425,859 and United States #1,011,068 deal with the condensation products of halogen-anthraquinone derivatives with primary amino derivatives where one but not both derivatives contains a carboxylic acid group. The resultant products thus obtained have the following general structures:

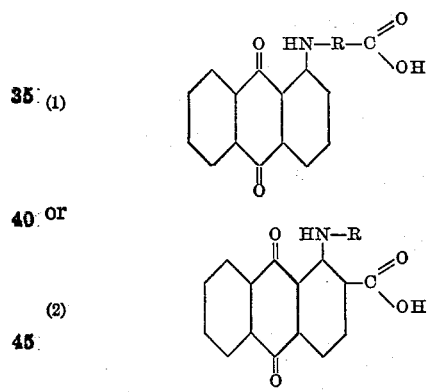

where the carboxylic acid groups are in the ortho-position to the (—NH) radical regardless of whether the

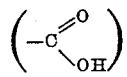

groups are in the anthraquinone nucleus or in the substituent radical (—R).

Furthermore, it is of general knowledge in the field of anthraquinone chemistry that, when there is present as in the above compounds a carboxylic acid group in a dianthraquinonylamine derivative or in an anthraquinone-phenyl-amino derivative as well as in an anthraquinone-naphthyl-amino derivative, if said carboxylic acid group is in the ortho position or adjacent to the amino group, the formation of the acridone structure takes place upon subjecting these compounds to a treatment with such condensing agents as phosphorous pentachloride, thionyl chloride, acetyl chloride, phosgene, benzo-trichloride or even concentrated sulphuric acid. These general principles may be illustrated by the following example:

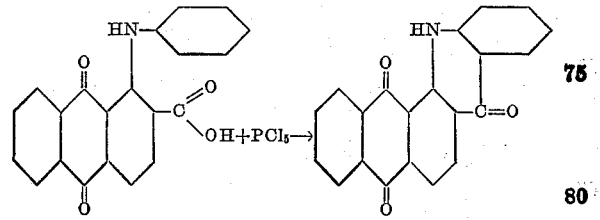

Other examples could be given. However, these will suffice for illustrating the fundamental principles under consideration.

The acridone dyes prepared from such intermediates, however, with the possible exception of two or three, have poor covering power on the fiber and furthermore they have a tendency to bleed, which, obviously, is disadvantage.

This being the present state of the art, the primary object of the present invention is therefore the preparation of vat dyes of the anthraquinone-acridone type which are free from the objections common to the dyes of this type heretofore known. Another object is the preparation of intermediates from which the new dyes may be prepared.

With these objects in view I have conceived the idea that if a new anthraquinone derivative could be prepared which had a carbonyl chloride grouping, it would be possible to prepare a new line of valuable colors which would have the advantages of both an acridone as well as a carbonyl-imid structure. The anthraquinone-acridone molecule was deemed suitable for this purpose.

These objects are accomplished by the following discoveries:

When 1 - halogen-anthraquinone-2-carboxylic acid is condensed with such aromatic primary amino-carboxylic acids as anthranilic, meta- and para-amino-benzoic acids or naphthyl-aminocarboxylic acids in a medium of an alkaline solution and in the presence of a catalyst as a copper salt, preferably cupric chloride or copper sulphate, a reaction ensues which results in the formation of dicarboxylic acid derivatives of anthraquinone, which, to my knowledge, are novel and are not recorded in the literature.

These new acids have the following probable structures, each one corresponding to the respective aromatic amino-carboxylic acid from which they may be derived:

(1)
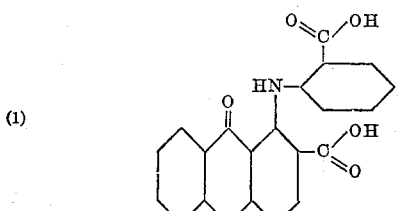
Ortho-derivative (2)
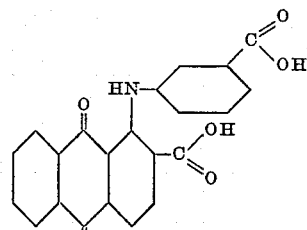
Meta-derivative (3)
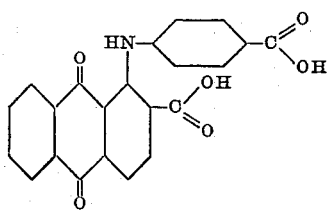
Para-derivative As already noted, the foregoing compounds by virtue of having one carboxylic acid group in the ortho position to the (—NH) linkage are capable of forming anthraquinone acridones when treated with such condensing agents as an excess of thionyl chloride or a slight excess of phosphorus pentachloride, or other suitable condensing agents, in a medium of an inert solvent such as nitrobenzene, solvent naphtha, dichlorobenzene or toluene. At the same time the carboxylic acid group is converted into a carbonyl-chloride group, with the result that the final product is an anthraquinone-phenyl-acridone, having a COCl group in the phenyl nucleus.

The chemical behavior of these anthraquinone-phenyl-acridone-carbonyl chlorides is of unusual importance to the synthesis of new vat dyes. They will readily condense with aliphatic and aromatic primary amines to form pink and violet colors. Furthermore, they lend themselves quite readily to simple condensations with all the amino derivatives of anthraquinone, producing colors which fall into the fast orange shades.

The invention will now be described more particularly as to its various phases.

As already indicated the first step in the preparation of the new dyes involves the preparation of the di-carboxylic acid derivatives of anthraquinone. The following examples will illustrate the general procedure for the derivation of the aforesaid compounds.

Example 1

200 parts of 1-chloro-anthraquinone-2-carboxylic acid and 100–110 parts of para-amino-benzoic acid are suspended in 2000–2500 parts of water. This suspension is then made alkaline with a sufficient quantity of caustic soda (solid or solution) to just turn the solution to the alkaline side. Both of the carboxylic acids will go into solution under these conditions. To this solution are then added 600–800 parts of sodium or potassium carbonate and 25–50 parts of cupric chloride and the whole is heated to the boiling point (100–104° C.), and maintained at this point for a period of six to eight hours, or until no further deepening of the color takes place. The solution is then diluted with twice its original volume of hot water and filtered directly. The filtrate will contain the dicarboxylic acid sought in the form of its sodium salt, and the residue will consist of copper salts and small amounts of by-products of an indefinite constitution. In order to isolate the free acid it is only necessary to acidify the filtrate with a mineral acid such as dilute hydrochloric or dilute sulphuric acid and by filtering off the precipitate a pure product is obtained which, after drying, is an orange-red powder, soluble in alkaline solution and insoluble in dilute acids, but soluble in strong sulphuric acid (colorless or slightly yellow solution).

Instead of using para-amino-benzoic acid, meta-amino-benzoic acid and ortho-amino-benzoic acid as well as the amino naphthoic acids may be used under the conditions similar to those described above, whereupon the corresponding dicarboxylic acids are obtained.

Example 2

200 parts of 1-chlor-anthraquinone-2-carboxylic acid and 110–120 parts of para-amino-salicylic acid are suspended in 2000–2500 parts of water and made alkaline as indicated in Example 1. 600–800 parts of sodium carbonate are then added, followed by 25–50 parts of cupric chloride and the charge is heated in the same manner as in the previous example. Under these conditions there is obtained a dicarboxylic acid which contains a hydroxyl-group in the phenylamine nucleus. This product has the following configuration:

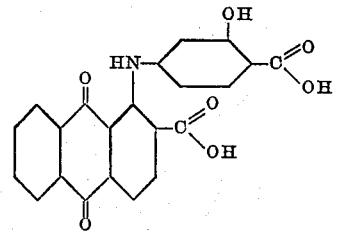

and consists of a violet powder, extremely soluble in an alkaline solution and in general has similar properties to the products described in Example 1. Instead of using para-amino-salicylic acid the isomeric meta- and ortho-derivatives may be used, thus arriving at the respective isomeric hydroxy-dicarboxylic acids.

In the above examples the cupric chloride is employed as a catalyst for the reaction.

It is to be understood that the examples furnished above are presented for purposes of illustration only, and that applicant does not intend to be limited to the particular reagents and conditions therein specified.

Thus, the invention contemplates, in the preparation of the di-carboxylic acid derivatives of anthraquinone, illustrated in Examples 1 and 2, the use of any catalyst agent adapted to promote the reaction desired. For example, copper powder and cuprous chloride may be substituted for the cupric chloride employed in the examples.

Furthermore, it will be understood that the compounds employed in the preparation of the dicarboxylic acid derivatives of anthraquinone may contain substituent groups in the aryl nuclei, such, for example, as halogen. It, of course, follows that the anthraquinone carbonyl chlorides will contain corresponding substituents.

As many apparently widely different embodiments of this invention may be made without departing from the spirit thereof, it is to be understood that I do not limit myself to the foregoing examples or description except as indicated in the following claims.

I claim:

1. A compound which in the form of free acid is represented by the formula

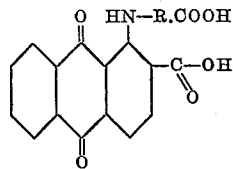

wherein R represents an aryl radical of the benzene or naphthalene series.

2. A compound of the type set forth in claim 1 wherein R represents a benzene nucleus.

3. A compound of the type set forth in claim 1 wherein R represents a benzene nucleus and the carboxylic group is in the position para to the amino group.

4. The process of preparing a dyestuff intermediate which comprises condensing a 1-chlor-anthraquinone-2-carboxylic acid with an aromatic primary amino-carboxylic acid of the benzene or naphthalene series in an alkaline medium and in the presence of a condensation catalyst.

5. A compound of the type set forth in claim 1 wherein R represents a naphthalene nucleus.

6. The process of preparing a dyestuff intermediate which comprises condensing a 1-chlor-anthraquinone-2-carboxylic acid with para-amino-benzoic acid in an alkaline medium and in the presence of a condensation catalyst.

7. The process of preparing a dyestuff intermediate which comprises condensing a 1-chlor-anthraquinone-2-carboxylic acid with para-amino-salicylic acid in an alkaline medium and in the presence of a condensation catalyst.

8. A compound which in the form of free acid possesses the formula

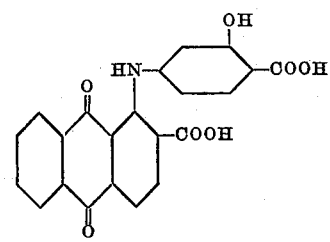

ALEXANDER J. WUERTZ.